July 19, 1955 F. ZOLLNER 2,713,526
PISTON
Filed Oct. 31, 1950

INVENTOR.
Fred Zollner.
BY
Elmer Jamison Gray
ATTORNEY.

United States Patent Office 2,713,526
Patented July 19, 1955

2,713,526
PISTON

Fred Zollner, Fort Wayne, Ind.

Application October 31, 1950, Serial No. 193,125

5 Claims. (Cl. 309—14)

This invention relates to improvements in the construction of a bi-metallic piston for an internal combustion engine, particularly to such a piston having an aluminum alloy body and a ferrous alloy ring carrying insert.

In order to provide proper support for the piston rings, it has been common in the construction of pistons for certain applications to cast a ferro-metallic insert or ring carrier in place on an aluminum alloy piston body. A difficulty in the use of such carriers results from the inability of the comparatively soft body to resist the normally severe forces applied to it during operation. Loosening of the insert on the body frequently occurs with consequent failure of the piston.

Numerous attempts have been made to overcome this objection, including the provision of an annular ring carrier fitting tightly within an annular recess around the piston body and having paired depending lugs extending around and cooperating with the piston pin bosses to support and interlock with the piston pin. Such structures have been materially improved in recent years by chemically bonding the insert to the aluminum body at the time of casting. However prior to the present invention, no completely satisfactory mechanical interlocking construction has been available. Piston failures have been common, resulting from imperfections in the chemical bond and its destruction under internal stresses released during machining of the piston as well as external forces exerted during its operation.

An important object of the present invention is to provide a bi-metallic piston of the foregoing nature having an improved ring carrier and interlocking engagement between the latter to achieve a superior efficient and economical piston construction.

Another and more particular object is to provide a piston comprising an annular ring carrying insert fitting snugly within an exterior annular recess around the piston body and having a pair of apertured lug portions extending downward along opposite outer sides of the piston body, the apertures in the lug portions registering with the customary diametrically opposed piston pin holes formed in internal bosses of the piston body. In this construction, the depending lugs also fit snugly within recesses in the exterior wall of the piston body and preferably lie flush therewith, these lugs being formed with exterior recesses within which integral portions of the piston body extend so as to effect a positive lock. The sidewalls of the aligned holes are machined to provide a precision fit with the piston pin and thereby to afford a positive mechanical interlock with the pin when the latter is inserted. In addition the recesses in the outer walls of the piston body for the ring carrier insert are undercut. The marginal inner portions of the insert are enlarged to fit tightly within the undercut and afford additional interlocking between the piston body and insert.

By the foregoing structure, a superior piston assembly is achieved and the insert is securely retained by the piston body under conditions that would otherwise loosen the conventional insert and cause failure of the piston, regardless whether the insert is also chemically bonded to the piston body or not. However it is also within the scope of the present invention to bond the insert chemically to the piston body to effect optimum strength and ruggedness of the bi-metallic assembly.

An additional important aspect of the present invention has been the discovery that failure of the conventional bi-metallic piston has resulted at least in part from differences in the coefficients of thermal expansion of the insert and piston body, resulting in unequal expansion of these members during operation and eventual disintegration of the chemical bond therebetween and loosening of the insert on the body.

It is accordingly another important object of the present invention to provide a bi-metallic piston assembly of the foregoing nature wherein the coefficients of expansion of the ferrous alloy insert and aluminum alloy body within the range of the usual operating temperatures are substantially the same.

Other objects of this invention will appear in the following description and appended claims, reference being had to the accompanying drawings forming a part of this specification wherein like reference characters designate corresponding parts in the several views.

Figure 1:
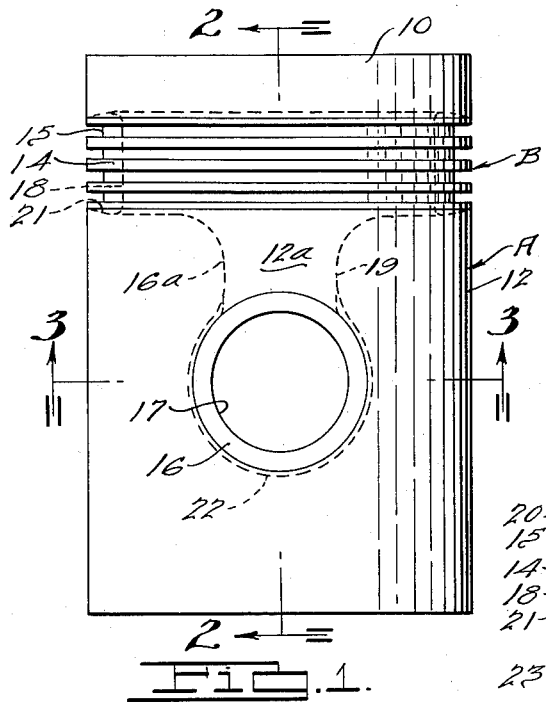
Fig. 1 is an elevation view of a piston constructed in accordance with the present invention.
Figure 2:
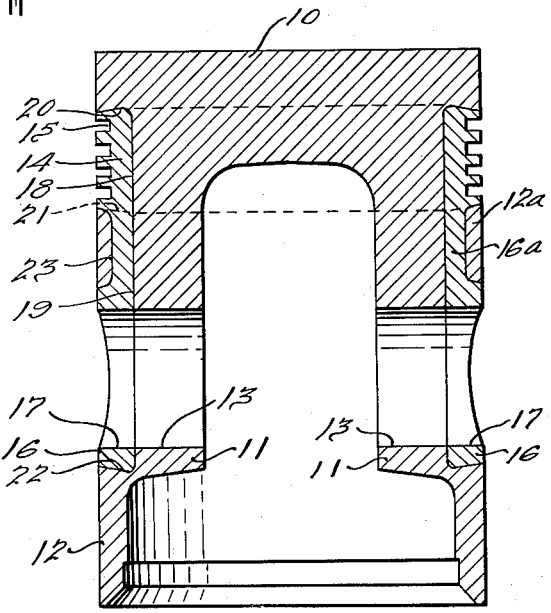
Fig. 2 is a vertical section taken in the direction of the arrows substantially along the line 2—2 of Fig. 1.
Figure 3:
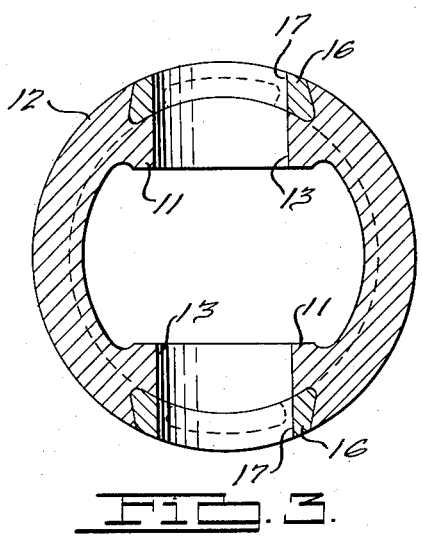
Fig. 3 is a horizontal section taken in the direction of the arrows substantially along the line 3—3 of Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is shown by way of example comprising a hollow aluminum alloy piston body A and a generally annular ferrous alloy ring carrying insert B suitably formed into a unitary bi-metallic cylindrical piston assembly, as for example by casting or forging, and preferably bonded together as discussed below. The body A includes the piston head 10, diametrically opposed internal piston pin bosses 11, and the depending skirt 12. The bosses 11 are provided with aligned holes 13 to receive the usual piston or gudgeon pin.

The insert B comprises an annular portion 14 provided with the desired number of piston ring grooves 15 and a pair of diametrically opposed depending lug portions 16 having pin holes 17 registering with the holes 13. The upper annular portion 14 fits snugly within an annular recess 18 in the outer portion of the body A, the recess extending downward at 19 on opposite sides to receive the lugs 16 snugly therein.

In order to provide adequate mechanical interlocking between the body A and insert B, required to withstand the pressure and particularly the inertia loads resulting during reciprocating operation by reason of the comparatively high specific gravity of the insert B, the aligned pin hole portions 13 and 17 at each side of the piston are accurately machined so as to receive the piston pin snugly therein within high precision limits. Accordingly, upon insertion of the piston pin through the paired pin holes, the body A and insert B will be firmly locked together by virtue of the pin snugly engaging the sidewalls of each of the hole portions 13 and 17. In addition, the upper and lower portions of the annular recess 18 are undercut at 20 and 21 respectively and the bottom and lower side portions of the recess 19 are undercut at 22. The corresponding marginal portions of the insert B are enlarged inward so as to conform to the undercuts and add to the interlocking engagement between the body A and insert B. To complete the mechanical interlocking, the neck portion 16a of each lug 16 connecting the same to the annular ring carrying portion 14 is recessed at 23 and filled by overlying portions 12a of the skirt 12, so that the outer surface of the latter in the region of the recess 23 extends unbrokenly across the aforesaid neck. From this construction it will be seen that the ring carrier is positively locked in place within the recess 18 by the portions 12a of the skirt, so that in effect the ring carrier is embedded within the body of the piston at the locality of the neck portions 16a of the ring carrier lugs.

It is thus apparent that the insert B is mechanically interlocked with the body A above and below the annular portion 14, across the neck of the lug 16, and along the sides and bottom of the latter, as well as by means of the piston pin fitting closely within the aligned precision machined holes 13, 17. It has been found that the interlocking structure described achieves a particularly serviceable bi-metallic piston assembly especially capable of operating under severe conditions without failure or loosening of the insert. Preferably the unitary character of the body A and insert B is increased by a suitable chemical bond therebetween, as for example a ferrous-aluminum bond or a ferrous-zinc-aluminum bond applied in accordance with procedure well known to the art. It has been found that where such bonding is so imperfect as frequently occurs that failure of pistons of conventional construction known heretofore would result under normally encountered conditions, the mechanical interlocking structure comprising the present invention will adequately support and prevent loosening of the insert B under comparable conditions.

Another important aspect of the present invention contributing to the superiority and serviceability of the bi-metallic piston disclosed has been the proper selection of alloys for the insert B and body A having comparable coefficients of thermal expansion. It has been found that by constructing the insert B of a ferrous alloy having a coefficient of thermal expansion substantially the same as that of the body A, mechanical failure of the piston and loosening of the insert, particularly when constructed as described above, is even further reduced. Accordingly with a customary aluminum alloy for the body A having a coefficient of expansion approximately equal to .0000111 per degree Fahrenheit in the range of 68° F. to 392° F., a ferrous alloy insert B having a similar coefficient approximately equal to .0000107 within a comparable operating temperature range is employed. An exact agreement between the coefficients of thermal expansion could be obtained by increasing the silicon content of the aluminum alloy, but such an increase would also decrease the machinability of the aluminum alloy. By virtue of the mechanical interlocking structure described above, the slight difference in thermal expansion amounting to approximately 3.6% causes no difficulty. In fact an insert alloy having a coefficient of thermal expansion of approximately .0000104, or differing by approximately 6.3% from the thermal expansion of the body, has proved satisfactory in application of the invention.

I claim:

1. In a composite piston for an internal combustion engine, a piston body having diametrically opposed pin supporting bosses with aligned pin holes therein, an insert recessed within the outer sidewall of the body and having an upper annular ring carrying portion around the upper part of the body, said insert also having a pair of diametrically opposed extensions depending from th annular insert portion and having holes in their lower ends registering with said pin holes and cooperating therewith to comprise a bore for a piston pin, the outer surfaces of said diametrically opposed extensions intermediate said bore and annular insert portion being recessed inward of the outer sidewall of the body, said outer surfaces being bridged by integral portions of said body completing an unbroken outer sidewall for said body around the circumference thereof intermediate said bore and annular insert portion, and the marginal portions of said insert above and below the annular insert portion and at the lower ends of said extensions entirely around said bore enlarging inward and underlying adjacent outer portions of said body.

2. In a composite piston for an internal combustion engine, a piston body having diametrically opposed pin supporting bosses with aligned pin holes therein, an insert recessed within the outer sidewall of the body and having an upper annular ring carrying portion around the upper part of the body, said insert also having a pair of diametrically opposed extensions depending from the annular insert portion and having holes in their lower ends registering with said pin holes and cooperating therewith to comprise a bore for a piston pin, said lower ends around the holes therein being enlarged circumferentially with respect to the intermediate portions of said diametrically opposed extensions connecting said lower ends with said annular insert portion, the outer surfaces of said intermediate portions being recessed inward of the outer sidewall of the body and being bridged by integral portions of said body completing an unbroken outer sidewall around the circumference thereof intermediate said bore and annular insert portion, and said insert enlarging inward from the outer marginal edges thereof above and below the annular insert portion and at the lower ends of said extensions entirely around said bore, thereby to underlie and interlock with adjacent outer portions of said body.

3. In a composite piston for an internal combustion engine, an aluminum alloy piston body having diametrically opposed pin supporting bosses with aligned pin holes therein, a ferrous alloy insert recessed within the outer sidewall of the body and having an upper annular ring carrying portion around the upper part of the body, said insert also having a pair of diametrically opposed extensions depending from the annular insert portion and having holes in their lower ends registering with said pin holes and cooperating therewith to comprise a bore for a piston pin, the outer surfaces of said diametrically opposed extensions intermediate said bore and annular insert portion being recessed inward of the outer sidewall of the body, said outer surfaces being bridged by integral portions of said body filling the intermediate recessed surfaces and completing an unbroken outer sidewall for said body around the circumference thereof intermediate said bore and annular insert portion, the marginal portions of said insert above and below the annular insert portion and at the lower ends of said extensions entirely around said bore enlarging inward and underlying adjacent outer portions of said body, and the coefficient of thermal expansion of the insert being not more than 6.3% less than the comparable coefficient of the body within the temperature range of 68° F. to 392° F.

4. In a composite piston for an internal combustion engine, an aluminum alloy piston body having diametrically opposed pin supporting bosses with aligned pin holes therein, a ferrous alloy insert recessed within the outer sidewall of the body and chemically bonded thereto, said insert having an upper annular ring carrying portion around the upper part of the body, said insert also having a pair of diametrically opposed extensions depending from the annular insert portion and having holes in their lower ends registering with said pin holes and cooperating therewith to comprise a bore for a piston pin, the outer surfaces of said diametrically opposed extensions intermediate said bore and annular insert portion being recessed inward of the outer sidewall of the body, said outer surfaces being bridged by integral portions of said body filling the intermediate recessed surfaces and completing an unbroken outer sidewall for said body around the circumference thereof intermediate said bore and annular insert portion, the marginal portions of said insert above and below the annular insert portion and at the lower ends of said extensions entirely around said bore enlarging inward and underlying adjacent outer portions of said body, and the coefficient of thermal expansion of the insert being not more than 6.3% less than the comparable coefficient of the body within the temperature range of 68° F. to 392° F.

5. In a composite piston for an internal combustion engine, a piston body having diametrically opposed pin supporting bosses with aligned pin holes therein, an insert recessed within the outer sidewall of the body, said insert having an upper annular ring carrying portion around the upper part of the body, said insert also having a pair of diametrically opposed extensions depending from the lower annular edge of the ring carrying portion and terminating downwardly in lug portions having holes registering with said pin holes and cooperating therewith to comprise a bore for a piston pin, the portion of each diametrically opposed extension in the area intermediate its lug portion and said ring carrying portion being recessed inwardly of the outer sidewall of the body and being bridged by an integral portion of said body thereby providing an unbroken outer sidewall for said body around the circumference thereof in said area.

References Cited in the file of this patent

UNITED STATES PATENTS

| | | |
|---|---|---|
| 1,807,689 | Deputy | June 2, 1931 |
| 2,066,802 | Rowntree et al. | Jan. 5, 1937 |
| 2,550,879 | Stevens | May 1, 1951 |

FOREIGN PATENTS

| | | |
|---|---|---|
| 429,637 | Germany | June 1, 1926 |
| 403,390 | Great Britain | Dec. 18, 1933 |
| 830,587 | Germany | Feb. 7, 1952 |

OTHER REFERENCES

Automotive Industries, page 413, Mar. 23, 1935.